Oct. 22, 1974 B. F. TOBIN III 3,843,408
METHOD OF CLEANING AIR FILTERS
Filed Oct. 2, 1972

United States Patent Office 3,843,408
Patented Oct. 22, 1974

3,843,408
METHOD OF CLEANING AIR FILTERS
Benjamin F. Tobin III, 10545 W. Loyola Drive,
Los Altos, Calif. 94022
Continuation-in-part of application Ser. No. 223,208, Feb. 3, 1972, which is a continuation-in-part of application Ser. No. 108,139, Jan. 20, 1971, now Patent No. 3,693,406, which in turn is a continuation of application Ser. No. 5,546, Jan. 26, 1970, now Patent No. 3,606,897. This application Oct. 2, 1972, Ser. No. 293,833
Int. Cl. B08b 3/02, 9/00
U.S. Cl. 134—24     5 Claims

ABSTRACT OF THE DISCLOSURE

Apparatus and method are described for washing hollow cylindrical engine air cleaners or filter elements. Cleaning and pressure, flow, and leak testing are all performed by successive soaping, rinsing, and pressure testing with aerated water. An aerated flow of water onto the filter membrane forces water through a sound membrane, and a mixture of water and air bubbles through a membrane with a tear or hole to provide a leak test. An inexpensive aerating nozzle is provided. A spray tube inside the filter washes off dirt and aspirates air for leak checking. The tube is movable along the length of the filter for best cleaning.

BACKGROUND

This is a continuation-in-part of my application Ser. No. 223,208, filed Feb. 3, 1972, entitled "Method and Apparatus for Cleaning and Inspection of Canister Type Air Filters" which is a continuation-in-part of my application Ser. No. 108,139, filed Jan. 20, 1971, entitled "Method for Inspecting Filters," now Pat. No. 3,693,406, which is a continuation of application Ser. No. 5,546, filed Jan. 26, 1970, by Benjamin F. Tobin and Milton J. Harris entitled "Apparatus for Cleaning of Canister Type Air Filters," now Pat. No. 3,606,897.

Heavy trucks, earthmovers and similar off-the-road equipment customarily include an air filter for removing dust from the air intake to the engine, thereby protecting the engine. Such air cleaners commonly have one or more cylindrical sections in each of which a pleated paper air filter element is positioned so that the intake air to the engine is passed through the porous paper of the filter. Any dirt, grit, or other foreign material is caught by the filter while the air passes so that it is prevented from entering the engine. When these filters have accumulated a substantial layer of dust, dirt and other debris, sometimes including oily material, they are removed and either discarded or cleaned.

In recent years, such cylindrical pleated paper filters have been made of resin impregnated paper which can be washed in order to remove accumulated dirt and debris so that the filter element can be reused many times, thereby effecting a very substantial cost saving without significantly decreasing the filtering efficiency of the air filter. Manual washing of the air filters involves a substantial amount of labor and is not customarily economical.

Inspection of cleaned air filters is also important to assure that no holes or tears are present in the filter paper that would permit dust particles to pass through and damage the engine. It is not only important to have thorough inspection with high reliability, but also it is desirable to provide the inspection at an early stage of the cleaning operation if possible to minimize the extent of cleaning given to a filter that is defective and need be discarded. Previously it has been the practice to clean the filter completely prior to inspection.

Although a large proportion of heavy equipment employs canister-type air filters having a fluted membrane of paper in the general form of a cylinder, another type is also employed that has resisted efforts to clean. This type of filter has a pair of rigid headers between which cylindrical pleated paper filter elements are arranged. Holes through one header provide access to the interior of each of the filter paper tubes and the other end is closed. These filters are typically rectangular and have from four to sixty-four tubes in commercially available embodiments. In such embodiments the hole through the header leading to the interior of the tubes is in the order of one inch diameter making it quite difficult to introduce a suitable washing nozzle. Access to the outside of the tubes is restricted since the adjacent elements prevent access to the elements from all sides. It is therefore desirable to provide a technique for cleaning and inspecting such filters, preferably by means of automatic or semi-automatic equipment.

With the best washing techniques previously available, it has been found that only a limited number of cleaning cycles can be performed on a filter before its ability to pass air is significantly diminished. Typically, after three or four washing operations the ability of the filter to pass air is diminished to the extent that it can no longer be used and must be discarded. It is therefore desirable to provide an improved washing technique that does not significantly diminish the air passing characteristics of an air filter.

BRIEF SUMMARY OF THE INVENTION

Thus, in practice of this invention according to a preferred embodiment, there is provided method and apparatus for forcing a cleaning liquid through an air filter membrane. The cleaning liquid may be aerated soapy water for cleaning and inspection or aerated clear water following soaking of the filter in soapy water. Fluid may be forced through by "pressurizing" an entire filter element with aerated liquid. A spray nozzle is moved inside the filter for thorough cleaning.

DRAWINGS

Other features and advantages of the present invention will be apparent from the following detailed description of a presently preferred embodiment when considered in connection with the accompanying drawings wherein.

DESCRIPTION

Figure 1:
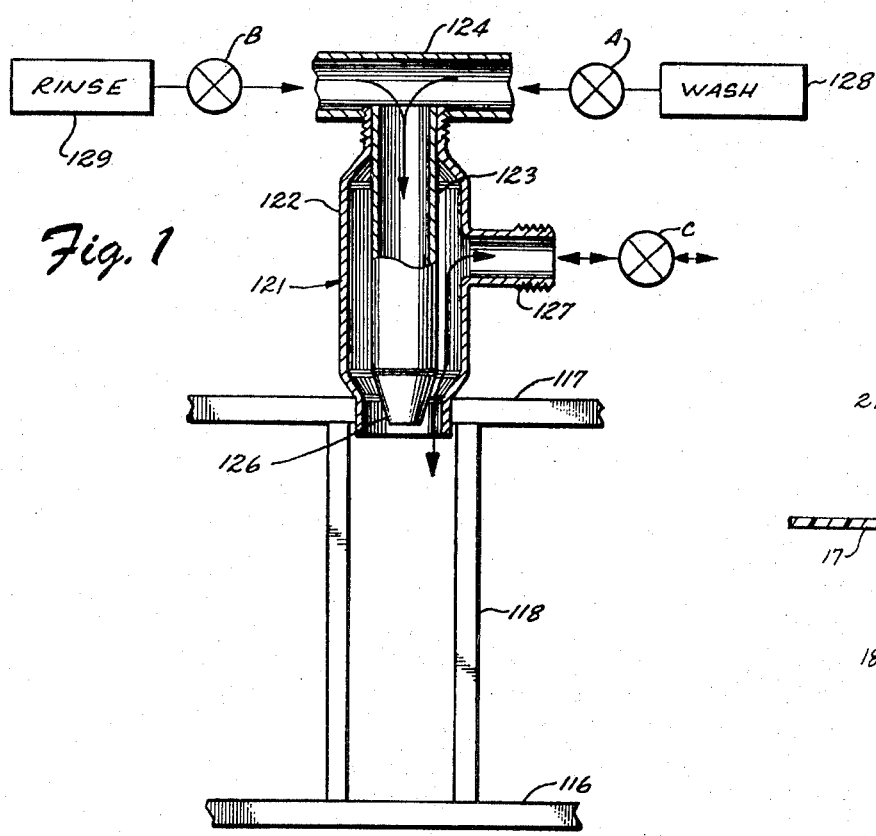
FIG. 1 illustrates semi-schematically an arrangement for cleaning and inspecting an air filter element in a bank of similar elements.

It has been found that the reason air filters lose their ability to pass substantial quantities of air as washings are repeated lies in gradual blocking of the pores in the paper by very fine particles. Most air filters of the type involved in practice of this invention, are employed in trucks or construction equipment operating in environments where motor oil and exhaust fumes are present. Apparently oils, unburned hydrocarbons, and the detergents in the motor oil accumulate in the paper filter element during operation. This is believed to produce a surface that has a high affinity for small particles and does not readily yield these particles under normal cleaning operations. Thus, as time progresses, the oils and associated particles accumulate in the filter until it is effectively plugged. It is believed that the relatively coarse particles seen on the surfaces of a dirty filter are of appreciably less significance in blocking air passage through the filter than are the fine particles trapped in the pores of the filter paper by the oils and detergents.

It has been found to be desirable for cleaning filters to employ an arrangement where at least a portion of cleaning liquid is forced through the filter paper so as to dislodge the oils and particles contained within the fine pores thereof.

Since the fine particles are to some extent retained by the oils, detergents and unburned hydrocarbons within the filter, it is found to be particularly effective to saturate the paper filter membrane with hot soapy water for dislodging the oils and particles. Hot soapy water is forced through the filter paper by impingement or pressure so that flow through the paper assures saturation. By soapy liquid it is not intended to refer only to soaps, but also to detergent solutions that may be effective in removing oils, unburned hydrocarbons and dirt.

The effectiveness of the cleaning technique where the cleaning liquid is forced through the filter membrane is shown in a very surprising manner. The efficacy of cleaning wherein cleaning liquid is forced to flow through the filter membrane is substantially the same whether the flow is from the dirty side towards the clean side or from the clean side towards the dirty side. Thus, it is found that the critical feature is flowed through the paper filter and not necessarily back-flushing through the filter.

Thus, for example, when a dirty filter has hot soapy water forced through it from the dirty side toward the clean side, substantially clean water flows through for a few seconds. Thereafter the water flowing through the filter is visibly dirty and once this occurs, it appears certain that the hot soapy water has soaked into the pores where dirt is entrapped. Thereafter forcing of additional soapy water or cold clear rinse water through the paper is effective in substantially completely restoring the filter to its original condition. One such filter soaked with hot soapy water and rinsed with cold clear water, at least one of which was forced to flow through the filter paper, has been cleaned and re-used sixteen times without noticeable deterioration in the ability to pass air.

Figure 5:
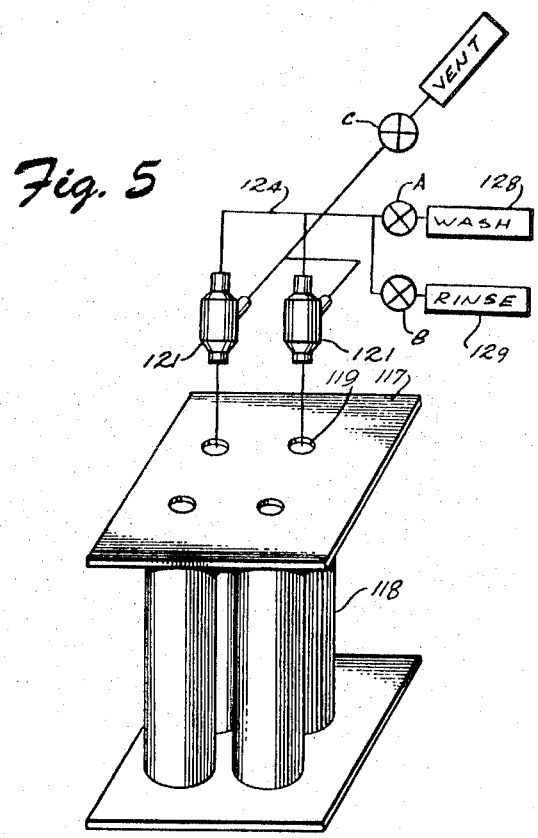
FIG. 5 illustrates means for cleaning a plurality of air filter elements.

One type of air filter element sometimes employed in trucks, earth moving equipment and the like, and apparatus for cleaning such a filter are illustrated semi-schematically in FIGS. 1 and 5. As best seen in FIG. 5, this type of filter is typically rectangular with a plastic layer 116 on one face and a plastic header 117 on the opposite face. Mounted in between the opposed plastic sheets 116 and 117 are a plurality of cylindrical filter elements 118. These filter elements are typically about 9 inches long and 2 to 2½ inches in diameter. They are formed of pleated paper with the pleats (not shown) about ¼ inch deep running along the length. One end of each paper filter element 118 is embedded in or sealed to the end plastic layer 116. The opposite end of each filter element is embedded in or sealed to the plastic header 117. A plurality of holes 119 through the header 117 communicate with the interior of each of the paper filter elements 118. From 4 to 64 filter elements are conventionally used in air filters of this type.

When a filter of this type is used, the air flow is through the holes 119 into the interior of the separate filter paper tubes 118. The air passes through these filter elements and thence through a surrounding perforated sheet (not shown) en route to the engine. Dirt therefore accumulates on the inside of the tubes rather than on the exterior as is more common in the canister-type filters. Previously there has been difficulty in cleaning this type of filter since the holes 119 are typically about 1 inch in diameter and access by washing nozzles is therefore difficult. The successive cleaning of the separate filter tubes 118 in the assembly is time consuming and has generally proved uneconomical.

It has been found that thorough and economic cleaning of a filter of the type illustrated in FIG. 5 can be accomplished in practice with this invention. The first step of cleaning may be to vacuum the interior of the tubes by placing the inlet of a conventional vacuum cleaner over the holes 119, either individually or in groups. This draws air in a reverse direction through the paper filter elements and the rather large loose dirt that accumulates within the filter elements is largely removed. Effective cleaning has been obtained without this step and it may be deleted in most instances.

The next cleaning step is to thoroughly saturate the paper filter elements with a cleaning liquid which is preferably hot soapy water which loosens the oils, detergents and unburned hydrocarbons within the pores of the filter paper, thereby loosening the fine dirt particles therein. Although saturation can be obtained by merely filling the cylindrical paper elements with hot soapy water, it is preferable to employ an aerating nozzle that is pressed into the hole 119 so as to engage the sides and effect a degree of sealing so that the interior of the paper filter elements 118 is slightly pressurized with the aerated liquid. This forces the hot soapy water to flow through the paper filter element and quickly effects saturation and removal of trapped fine dirt particles.

The presence of aeration in the soaping or rinsing liquid is desirable since any perforations, tears, pin holes or the like permit the air bubbles to pass and result in a flow of bubbles on the outside of the filter element which are readily noticed by the operator. If no bubbles are seen, the filter is sound and can be restored to service. The aerated water inspection technique is particularly valuable with a filter of this geometry because visual inspection is extremely difficult.

When aerated water is forced to flow through a filter a sound filter paper membrane permits the water to percolate through and heavy flow can be seen on the opposite side. Air entrained in the water is either diverted on the side where the nozzle is, or, there is good reason to believe, a substantial portion of the air also passes through the filter in sufficiently fine dispersed streams or bubbles that no visible bubbles are seen on the far side from the nozzle. Thus, in a sound filter it appears to the observer that only water is passing through.

If, on the other hand, there is a small hole or tear in the filter paper membrane, the flow of air is relatively unrestricted and a stream of bubbles immediately appears at the location of the hole. It has been found that this flow of air bubbles through the filter paper provides a very sensitive and reliable test for holes and tears, even those sufficiently small that they are difficult to find by conventional light inspection techniques. Holes adjacent the ends of the filter where light inspection techniques are not suitable, are also found with facility by forcing aerated air against the filter element with sufficient force that a substantial amount of water is forced through the paper.

A particular advantage arises from the detection of holes and tears by forceful flow of aerated water since both cleaning and inspection can be combined in a single operation. Since the test begins at the very beginning of the cleaning cycle, any filter that shows the presence of pin holes or tears can be immediately withdrawn from the cleaning cycle and discarded, thereby saving the additional expenditure of time require to clean the filter before inspection. It will also be noted that inspection of the entire filter paper is obtained both during the initial cleaning cycle and also during the rinsing cycle so that the chances of overlooking a pin hole or tear are significantly reduced. During cleaning a substantial pressure gradient is produced across the filter membrane and weak filters that might rupture during use are detected since they rupture during the cleaning operation. It will be noted that a wet filter during the washing operation is not as strong as the dry filter actually put into service.

Thus, it will be seen that during the cleaning operation, quick and reliable pressure, flow rate, and leak inspection is obtained.

By using an aerated flow of water against the filter after cleaning in the automatic station, any leaks in the filter can be detected at an early stage before all of the cleaning operations have been completed. After washing the filters in the disclosed apparatus they are dried for many hours at low temperature in a forced drying oven for complete drying without damaging the resins in the paper. After prolonged drying, the filters are inspected with bright lights for holes or tears. By detecting such holes or tears immediately after washing, the filter can be immediately discarded instead of going through the drying and subsequent inspection cycles, thereby effecting a substantial saving of time and effort.

FIG. 1 illustrates semi-schematically in transverse cross-section an arrangement found suitable for cleaning filters of the type illustrated in FIG. 5. Thus, as illustrated in this embodiment, a special nozzle 121 is inserted into the hole 119 through the header 117. This nozzle has a hollow body 122 concentric with an inlet tube 123. The upper end of the tube 123 beyond the body is threaded to fit a manifold 124 indicated only schematically. At its lower end, the body is constricted to fit within the hole 119 through the header 117. The tube 123 which may be either straight or tapered extends down to the constriction and is pinched into a nozzle tip 126 like that illustrated in FIGS. 2 and 3. A threaded side tube 127 communicates with the interior of the body.

Referring again to FIG. 1, a valve A connects the manifold 124 to a supply 128 of washing liquid which is typically hot water containing a suitable soap or detergent. A second valve B connects the manifold to a source 129 of rinsing liquid, such as, for example, clear, cool water. A third valve C is connected to the side tube 127 for selectively closing this tube which otherwise vents to the ambient. The three valves may be manually operated, or preferably are air or vacuum operated for quick response. For some applications the valve C can be merely a tube that can be momentarily closed with the operator's thumb.

For cleaning the filter element 118, a valve C is left open to vent the interior of the body 122 to the outside. First, the valve A to the soapy water supply is opened to admit soapy water through the nozzle tip 126 into the interior of the filter. Since a dirty filter is typically nearly plugged up with dirt, a pressure of about 20 p.s.i. is used to avoid rupturing normally sound filter elements. A portion of the water coming through the nozzle tip dislodges heavy dirt that may have accumulated within the filter element and discharges this dirt through the vent valve C. (Because of this, it is often possible to delete the above-mentioned step of vacuuming the filters before cleaning.) Another portion of the hot, soapy water soaks into and through the paper of the filter element. When such dirty water is observed flowing freely from the outside of the filter, it can be assumed that the paper is sufficiently saturated. Typically in most filters, only a few seconds are required to sufficiently saturate the paper. Thereupon, the valve A is closed.

Next, the filter is rinsed by opening the valve B to the source of rinse water. Because some of the dirt has been dislodged in the washing operation, a higher pressure, typically about 40 p.s.i., may be used for the rinse water. Initially, rinse water flows through the vent valve C and through the paper of the filter element. This serves to dislodge additional dirt from within the filter element and discharge it through the vent.

As the rinsing proceeds, the very fine dirt lodged in the paper of the filter element is washed out and more and more water flows through the paper filter element itself. It is found that as the water flowing through the filter and spilling through the vent becomes clear and free of dislodged dirt, the flow out through the vent diminishes and the venturi action of the nozzle tip 126 within the constricted portion of the body 122 begins to draw air in through the vent valve C. Surprisingly, at the same time water may be flowing out of the vent and air flowing in. The result is that the vent, the nozzle body, and the interior of the filter element are filled with aerated water under moderate pressure. If there is a leak in the filter element, this aerated water flows through and provides an excellent indication of the leak as hereinabove described.

When the water flowing from the filter and vent are substantially clean, the vent valve C is closed for one or two seconds. Since the rinse valve B is still open, the pressure on the aerated water within the filter element increases and any leaks are even more apt to be detected. In addition, the quantity of water flowing through the filter element is observed and permanently plugged filters can be discarded. Since the interior of the filter element is pressurized, a pressure test is also provided for detection of weak filter elements. Sometimes weak filter elements, leaks, and poor flow rate can be detected during the washing or rinsing steps and the filter can be discarded before reaching the inspection step where the vent valve C is closed.

The valve positions during the cleaning and inspection cycles can be summarized in the following table:

| Cycle | Valve A | Valve B | Valve C |
| --- | --- | --- | --- |
| Wash | Open | Closed | Open. |
| Rinse | Closed | Open | Do. |
| Test | do | do | Closed. |

After rinsing with the cold clear water it is preferred to invert the filter assembly and spray the exterior with clear water to wash off any dirt particles that may be on the exterior. After washing, the filters are dried in a low temperature oven in a conventional manner.

It will be noted that with this cleaning arrangement the flow of cleaning liquids is from the dirty side of the filter to the clean side. However, it has been found that with such technique the cleaning is every bit as good as can be obtained with a reverse flush which, because of the geometry of this filter, would be somewhat difficult to obtain.

Preferably, the nozzle is of a type giving an aerated spray preferably in a general fan shape so as to best impinge within the pleats of the filter paper. Typically, aerated water has entrained bubbles of air so that the water is a substantially continuous phase and the bubbles are discontinuous. This is to be distinguished from a jet spray of water which is either a continuous stream of water without bubbles of air or is in the form of discrete droplets of water wherein air would be the substantially continuous phase and the droplets would be discontinuous. Conventional aerating nozzles such as very commonly used in kitchen faucets and the like are suitable.

Figure 2:
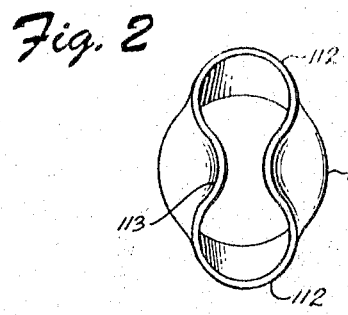
FIGS. 2 and 3 illustrate in end and side views a form of nozzle useful for cleaning and inspecting air filters.
Figure 3:
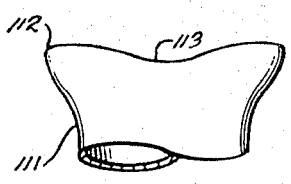

An inexpensive nozzle that has proved particularly suitable for thorough cleaning of air filters is illustrated in FIGS. 2 and 3 which comprise end and side views, respectively, of the very simple nozzle. Typically, such a nozzle is formed by merely pinching the end of a piece of copper tubing 111. The end is pinched from two sides so that the tubing collapses towards a general FIG. 8 shape transverse to the direction of fluid flow as seen end on in FIG. 2. The pinching causes the tube to bulge slightly in a direction transverse to the direction of pinching so that the pinched end has a pair of slightly bulging lobes 112 separated by a narrowed waist 113. In a typical embodiment, the waist 113 has an inside width about one-third or less of the inside diameter of the tubing 111. A nozzle formed in this manner provides a fan-shaped spray with an included angle of about 20°–25° and by greater pinching can be 60°–90°. It is believed that the velocity of flow near the center of the fan-shaped spray is higher than near the edge and that in the region near the nozzle air is entrained to some degree in the water so that the water can be considered to be aerated, even though not so much so as with a conventional aerating nozzle such as employed in kitchen sinks and the like. If desired, air can be injected in the water stream a considerable distance upstream from the nozzle.

Figure 4:
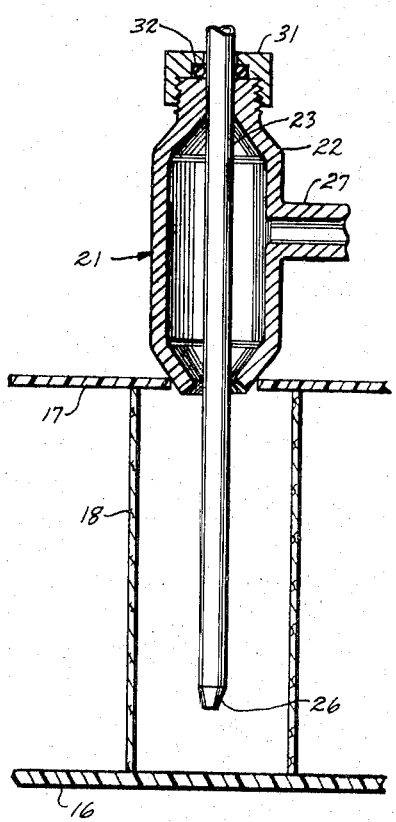
FIG. 4 illustrates semi-schematically an improved means for cleaning an air filter element.

FIG. 4 illustrates semi-schematically in longitudinal cross-section a variation in the filter washing apparatus illustrated in FIG. 1. As in that embodiment the filter comprises a bottom layer 16 and a top header 17 having a plurality of pleated paper filter elements 18 therebetween. A nozzle head 21 has its nose inserted in a hole in the header to communicate inside the filter element 18. The nozzle head has an enlarged body 22 converging at its lower end to provide a tight fit with the hole through the filter header 17. If desired, a resilient layer may be provided on the tapered nose of the nozzle head to provide a fluid seal to the header. A side vent 27 communicates with the interior of the body. The side vent may lead to a valve, or as mentioned above, may be temporarily plugged by the operator's thumb to provide filter inspection.

A tube 23 extends through the enlarged body 22. A packing nut 31 is threaded onto the body and captures an O-ring 32. This arrangement permits the tube 23 to be slidably moved up and down through the nozzle body and into the interior of the filter element 18. Rotation of the tube is also permitted. A nozzle tip 26 is provided on the end of the tube 23. The nozzle 26 is preferably merely an end of the tube pinched into a figure 8 configuration as hereinabove described and illustrated in FIGS. 2 and 3. Typically, for example, the tube 23 is a one-half inch copper tube with its end pinched to form the nozzle 26.

The basic mode of operation of the filter washing arrangement illustrated in FIG. 4 is similar to that hereinabove described. It has been found desirable, however, for extremely dirty filters to provide a washing action that directs a forceful flow of fluid into the pleats of the filter. Such forceful flow is obtained by sliding the tube 23 up and down through the nozzle body so that the nozzle tip 26 moves within the filter element. The tube is also rotated since the nozzle tip 26 has a fan shaped spray with its axis on the axis of the filter element. This fan shaped flow of water reaches into the deepest creases of the pleats and dislodges any dirt trapped therein. By rotating the tube and moving it up and down all of the pleats can be rapidly and thoroughly cleaned. Manual moving of the tube has proved satisfactory.

The nozzle having a downwardly directed flow of water in a generally fan shape has proved to be eminently satisfactory. The downwardly directed flow of water impinges on the filter membrane at an angle and appears to be better in opening the pleats and reaching the deepest folds thereof than a spray of water directed radially outwardly normal to the pleats. In addition, the downwardly directed flow stirs up any dirt that would tend to settle in the bottom of the closed end of the filter element and entrain it in the escaping water to flow out of the vent 27. This fan shaped spray is also desirable since it permits a strong flow of downwardly directed water in opposite portions of the interior of the filter element while at the same time, ninety degrees away, there can be a strong upward flow permitting the water and entrained dirt to be discharged from the top of the filter element. The nozzle tip producing a fan shaped spray also serves to suck in air and fill the interior of the filter element with aerated water. Such aeration is particularly vigorous when the tube and nozzle tip are withdrawn from the filter element to a position approximately as shown in FIG. 1. It will be apparent that other nozzle tips may be suitable. Thus, for example, a tip may be used with two or three holes extending radially downwardly for impinging a flow of water on the filter element at an angle. This would be generally fan shaped even with little flow along the axis and most flow radially down.

Soapy wash water and rinse water are successively applied through the tube 23. Preferably the washing and rinsing action starts with the nozzle tip 26 about one-half inch from the bottom of the filter element and it is then drawn up and down a few times as it is rotated to carry out any entrained dirt. After such washing and rinsing the vent 27 is closed for a short interval for final inspection and pressure testing of the filter element.

FIG. 5 illustrates semi-schematically apparatus for automatically cleaning several elements of a filter according to the above-described technique. The larger filters commercially available have the paper elements arranged in rows of four or eight and to increase filter size additional rows are added. The semi-automatic cleaning apparatus therefore has a pair of cleaning heads 123 and if desired additional heads can be coordinated with the illustrated pair. Each of the cleaning heads comprises a nozzle 121 as illustrated in FIG. 1. Each nozzle is tapered at lower end so as to fit into and provide a partial seal on the hole 119 to minimize leakage of water from within the filter elements and thereby maintain a degree of pressurization therein. If desired, a resilient rubber seal (not shown) can be employed on the nozzle to afford a better seal. A spring may be used on each nozzle 121 so that they are individually biased towards the filter to be cleaned so that an entire bank of cleaning heads can be brought down against a filter and all of the cleaning heads can seal against the holes 119 with approximately equal force.

The several cleaning heads 123 are connected to a liquid manifold 124, illustrated only schematically. The manifold is connected to the wash liquid 128 by a valve A. A second valve B connects the manifold to a supply of rinse water 129. To use the semi-automatic cleaning equipment, the pair of cleaning heads 121 is brought down against the filter so that the nozzles close the holes 119 and the valves are operated in the above-described manner for cleaning and inspecting the filter. If desired internal tubes can be raised and lowered for thorough cleaning inside the filter elements in the manner hereinabove described and illustrated in FIG. 4.

It has also been found that the cleaning action is obtained when a tube having a nozzle that directs water laterally is moved inside each chamber of the filter without a sealing head in place. If one merely inserts a tube like tube 23 in FIG. 4 in the filter without any nozzle 21 in place, good washing action is obtained. The impingement causes heavy water flow through the filter as well as out of the end. The ability to pressurize for detecting leaks is diminished although if large leaks are present aerated flow may be seen. This type of cleaning alone can be done manually by moving the tube within the filter chamber. This can be done as a substitute for the combined cleaning and inspection described above, or can be a preceding step. Thus, one can wash manually with hot soapy water and subsequently rinse and inspect with cold clear water.

It will be apparent that if desired other arrangements of cleaning nozzles for a bank of filter elements can be used, such as groups of four, as may be best suited to a particular cleaning operation. Manual insertion of the pair of nozzles is suitable or automatic arrangements may be employed. Many other modifications and variations of the present invention can be made by one skilled in the art. It is therefore to be understood that within the scope of the appended claims the invention may be practiced other than as specifically described.

What is claimed is:

1. A method of cleaning a cylindrical filter element having longitudinal pleats and dirt on the inside thereof comprising the steps of:
   at least partially closing the end of the filter element;
   inserting a nozzle through the closed end for impinging a forceful flow of water against the filter element in a direction along the pleats and at an angle to a normal to the pleats; and moving the nozzle along the length of the filter element for dislodging dirt from the pleats, and wherein the end is partially open so that a portion of the forceful flow discharges therethrough for carrying surface dirt and another portion of the forceful flow passes through the filter element for dislodging dirt from the pores thereof.

2. A method of cleaning a filter element as defined in claim 1 wherein the inserting and impinging step comprises:
generating a fan shaped flow of water; and
impinging opposite sides of the fan shaped spray against opposite portions of the inside of the filter element.

3. A method of cleaning a filter or the like having a liquid wettable porous membrane normally dirty on the inside and normally clean on the outside consisting of the steps of:
pressurizing a partially closed inside portion of the filter membrane for forcing water through the filter membrane from the normally dirty side to the normally clean side to displace particles from the pores of the membrane;
moving the source of a forceful flow of water adjacent the dirty side of the filter membrane for impinging on different regions of the filter at different times for dislodging surface dirt therefrom, said moving step being coincident with the forcing step; and
maintaining a sufficient opening from the partially closed inside portion that a portion of the forceful flow is discharged from the opening and a portion is discharged through the filter membrane.

4. A method of cleaning a filter as defined in claim 3 wherein the moving step comprises impinging water on a face of the filter membrane at an angle from a normal to the filter membrane surface.

5. A method of cleaning a filter as defined in claim 3 wherein the filter element comprises a cylinder having pleats extending along its length and the moving step comprises:
moving a fan-shaped spray of water along the length of the element, the axis of the fan being along the element axis.

References Cited

UNITED STATES PATENTS

| | | | |
|---|---|---|---|
| 1,940,615 | 12/1933 | Webster | 134—167 R |
| 3,608,567 | 9/1971 | Neill | 134—10 X |
| 3,688,780 | 9/1972 | Everroad | 134—21 |

MORRIS O. WOLK, Primary Examiner

T. W. HAGAN, Assistant Examiner

U.S. Cl. X.R.

134—29, 34, 167 R